(12) United States Patent
Wright et al.

(10) Patent No.: US 10,552,412 B2
(45) Date of Patent: Feb. 4, 2020

(54) QUERY TASK PROCESSING BASED ON MEMORY ALLOCATION AND PERFORMANCE CRITERIA

(71) Applicant: Deephaven Data Labs LLC, Plymouth, MN (US)

(72) Inventors: Charles Wright, Cortlandt Manor, NY (US); Ryan Caudy, New York, NY (US); David R. Kent, IV, Colorado Springs, CO (US); Mark Zeldis, Randolph, NJ (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 452 days.

(21) Appl. No.: 15/448,930

(22) Filed: Mar. 3, 2017

(65) Prior Publication Data

US 2017/0177677 A1   Jun. 22, 2017

Related U.S. Application Data

(63) Continuation of application No. 15/154,991, filed on May 14, 2016, now Pat. No. 9,613,109.
(Continued)

(51) Int. Cl.
*G06F 17/30* (2006.01)
*G06F 16/2453* (2019.01)
(Continued)

(52) U.S. Cl.
CPC ........ *G06F 16/2453* (2019.01); *G06F 3/0481* (2013.01); *G06F 3/0482* (2013.01);
(Continued)

(58) Field of Classification Search
CPC .... G06F 16/2453; G06F 16/27; G06F 16/907; G06F 16/9574; G06F 16/144; G06F 16/162; G06F 16/22; G06F 16/221; G06F 16/2237; G06F 16/2379; G06F 16/242; G06F 16/245; G06F 16/24537; G06F 16/285; G06F 16/2246; G06F 16/2272; G06F 16/23; G06F 16/2428;
(Continued)

(56) References Cited

U.S. PATENT DOCUMENTS 5,335,202 A   8/1994 Manning et al.
5,452,434 A   9/1995 Macdonald
(Continued)

FOREIGN PATENT DOCUMENTS

CA   2309462 A1   12/2000
EP   1406463 A2   4/2004
(Continued)

OTHER PUBLICATIONS

Final Office Action dated Aug. 10, 2018, in U.S. Appl. No. 15/796,230.
(Continued)

*Primary Examiner* — Tyler J Torgrimson
(74) *Attorney, Agent, or Firm* — Carmichael IP, PLLC

(57) ABSTRACT

Described are methods, systems and computer readable media for query task operations based on memory allocation and performance criteria.

42 Claims, 9 Drawing Sheets

Related U.S. Application Data

(60) Provisional application No. 62/161,813, filed on May 14, 2015.

(51) Int. Cl.

| | | |
|---|---|---|
| G06F 16/23 | (2019.01) | |
| G06F 16/22 | (2019.01) | |
| G06F 16/27 | (2019.01) | |
| G06F 16/16 | (2019.01) | |
| G06F 16/215 | (2019.01) | |
| G06F 16/245 | (2019.01) | |
| G06F 16/248 | (2019.01) | |
| G06F 16/25 | (2019.01) | |
| G06F 16/28 | (2019.01) | |
| G06F 16/907 | (2019.01) | |
| G06F 16/951 | (2019.01) | |
| G06F 16/242 | (2019.01) | |
| G06F 16/2455 | (2019.01) | |
| G06F 16/2457 | (2019.01) | |
| G06F 16/901 | (2019.01) | |
| G06F 16/9535 | (2019.01) | |
| G06F 16/955 | (2019.01) | |
| G06F 16/957 | (2019.01) | |
| G06F 21/00 | (2013.01) | |
| G06F 21/62 | (2013.01) | |
| G06F 3/0482 | (2013.01) | |
| G06F 3/0489 | (2013.01) | |
| G06F 17/22 | (2006.01) | |
| G06F 17/24 | (2006.01) | |
| G06F 17/27 | (2006.01) | |
| G06F 12/084 | (2016.01) | |
| H04L 12/58 | (2006.01) | |
| G06F 15/173 | (2006.01) | |
| G06F 3/0481 | (2013.01) | |
| G06F 3/0484 | (2013.01) | |
| G06F 3/0485 | (2013.01) | |
| G06F 12/02 | (2006.01) | |
| G06F 8/30 | (2018.01) | |
| G06F 8/41 | (2018.01) | |
| H04L 29/08 | (2006.01) | |
| G06F 3/06 | (2006.01) | |
| G06F 11/14 | (2006.01) | |
| H04L 29/06 | (2006.01) | |
| G06F 8/60 | (2018.01) | |
| H04L 12/18 | (2006.01) | |
| H04L 29/12 | (2006.01) | |
| G06F 12/14 | (2006.01) | |
| G06F 3/0483 | (2013.01) | |
| G06F 16/14 | (2019.01) | |
| G06F 16/11 | (2019.01) | |
| G06F 17/40 | (2006.01) | |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 17/2235* (2013.01); *G06F 17/24* (2013.01); *G06F 17/245* (2013.01); *G06F 17/246* (2013.01); *G06F 17/276* (2013.01); *G06F 17/2715* (2013.01); *G06F 21/00* (2013.01); *G06F 21/6209* (2013.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(58) Field of Classification Search
CPC ......... G06F 16/24539; G06F 16/24553; G06F 16/215; G06F 16/2255; G06F 16/2282; G06F 16/2308; G06F 16/24534; G06F 16/9566; G06F 16/2228; G06F 16/2372; G06F 16/2455; G06F 16/2456; G06F 16/24575; G06F 16/278; G06F 16/9535; G06F 16/2358; G06F 16/2365; G06F 16/951; G06F 16/113; G06F 16/2264; G06F 16/24535; G06F 16/2457; G06F 16/248; G06F 16/254; G06F 16/9024; G06F 3/0481; G06F 3/0482; G06F 3/0483; G06F 3/04847; G06F 3/0485; G06F 3/04895; G06F 3/0605; G06F 3/0656; G06F 3/067; G06F 8/30; G06F 8/41; G06F 8/427; G06F 8/60; G06F 11/1451; G06F 11/1464; G06F 11/1469; G06F 12/0261; G06F 12/084; G06F 12/1483; G06F 15/17331; G06F 17/2235; G06F 17/24; G06F 17/245; G06F 17/246; G06F 17/2715; G06F 17/276; G06F 21/00; G06F 21/6209; G06F 16/2291; G06F 17/40; G06F 2201/805; G06F 2201/84; G06F 2212/1052; G06F 2212/154; G06F 2212/163; G06F 2212/60; H04L 12/18; H04L 51/046; H04L 51/12; H04L 61/2069; H04L 63/101; H04L 63/102; H04L 67/1002; H04L 67/141; H04L 67/28; H04L 67/2833; H04L 67/2842; H04L 67/34; H04L 67/42; H04L 69/16; H04L 67/2847

See application file for complete search history.

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A | 12/2000 | Lea et al. |
| 6,253,195 B1 | 6/2001 | Hudis et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,397,206 B1 | 5/2002 | Hill et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,519,604 B1 | 2/2003 | Acharya et al. |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,801,908 B1 | 10/2004 | Fuloria et al. |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,047,484 B1 | 5/2006 | Becker et al. |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Gfiukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |

(56) References Cited

U.S. PATENT DOCUMENTS

| | | |
|---|---|---|
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dellinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,477,702 B1 | 10/2016 | Ramachandran et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dellinger et al. |
| 2004/0015566 A1 | 1/2004 | Anderson et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |

(56) References Cited

U.S. PATENT DOCUMENTS

| | | |
|---|---|---|
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dellinger et al. |
| 2006/0116999 A1 | 6/2006 | Dettinger et al. |
| 2006/0131383 A1 | 6/2006 | Battagin et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0070721 A1 | 3/2010 | Pugh et al. |
| 2010/0114890 A1 | 5/2010 | Hagar et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Pens |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |

(56) References Cited

U.S. PATENT DOCUMENTS

| | | |
|---|---|---|
| 2014/0292765 A1 | 10/2014 | Maruyama et al. |
| 2014/0297611 A1 | 10/2014 | Abbour et al. |
| 2014/0317084 A1* | 10/2014 | Chaudhry .......... G06F 16/24552 707/713 |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Vein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |
| 2017/0161514 A1 | 6/2017 | Dellinger et al. |
| 2017/0185385 A1 | 6/2017 | Kent et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0004796 A1 | 1/2018 | Kent et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

Final Office Action dated Aug. 2, 2018, in U.S. Appl. No. 15/154,996.
Final Office Action dated Aug. 28, 2018, in U.S. Appl. No. 15/813,119.
Final Office Action dated Jun. 18, 2018, in U.S. Appl. No. 15/155,005.
Final Office Action dated May 18, 2018, in U.S. Appl. No. 15/654,461.
Non-final Office Action dated Apr. 12, 2018, in U.S. Appl. No. 15/154,997.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Jun. 29, 2018, in U.S. Appl. No. 15/154,974.
Non-final Office Action dated Jun. 8, 2018, in U.S. Appl. 15/452,574.
Notice of Allowance dated Apr. 30, 2018, in U.S. Appl. No. 15/155,012.
Notice of Allowance dated Jul. 11, 2018, in U.S. Appl. No. 15/154,995.
Notice of Allowance dated May 4, 2018, in U.S. Appl. No. 15/897,547.
Notice of Allowance dated Sep. 11, 2018, in U.S. Appl. No. 15/608,963.
Final Office Action dated Mar. 1, 2017, in U.S. Appl. No. 15/154,975.
Non-final Office Action dated Mar. 2, 2017, in U.S. Appl. No. 15/154,984.
Notice of Allowance dated Mar. 2, 2017, in U.S. Appl. No. 15/154,998.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_ Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.

(56) References Cited

OTHER PUBLICATIONS

Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Feb. 8, 2017, in U.S. Appl. No. 15/154,997.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appil. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 10, dated Jun. 12, 2012, Windows PowerShell Blog, pp. 1-6 Retrieved: https://biogs0.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Nes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQl Querying using Path Partitioning", 31st IEEE International Conference on Data ngineering (ICDE 2015), Seoul, Korea, Apr. 13-17, 2015. Retreived from http://imada.sdu.dk/~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 95 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/ http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc_22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retreived from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.

(56) References Cited

OTHER PUBLICATIONS

"Tracking Data Changes", SQl Server 2008 R2, dated Sep. 22, 2015. Retreived from https://web.archive.org/web/20150922000614/ https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Borror, Jefferey A. "Q for Mortals 2.0", dated Nov. 1, 2011. Retreived from http://code.kx.com/wiki/JB:QforMortals2/contents.
Cheusheva, Svetlana. "How to change the row color based on a cell's value in Excel", dated Oct. 29, 2011 Retrieved from https://www.ablebits.com/office-addins-blog/2013/10/29/excel-change-row-background-color/ (last accessed Jun. 16, 2016).
Ex Parte Quayle Action dated Aug. 8, 2016, in U.S. Appl. No. 15/154,999.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
Hartle, Thom, Conditional Formatting in Excel using CQG's RTD Bate Function (2011), http://news.cqg.com/blogs/exce/I2011/05/conditional-formatting-excel-using-cqgs-rtd-bate-function (last visited Apr. 3, 2019).
Maria Azbel, How to hide and group columns in Excel AbleBits (2014), https://www.ablebits.com/office-addins-blog/2014/08/06/excel-hide-columns/ (last visited Jan. 18, 2019).
Mark Dodge & Craig Stinson, Microsoft Excel 2010 inside out (2011).
Svetlana Cheusheve, Excel formulas for conditional formatting based on another cell AbleBits (2014), https://www.ablebits.com/office-addins-blog/2014/06/10/excel-conditional-formatting-formulas/comment-page-6/(last visited Jan. 14, 2019).
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appi. No. 15/154,997
Final Office Action dated Apr. 10, 2017, in U.S. Appl. No. 15/155,006.
Final Office Action dated Dec. 29, 2017, in U.S. Appl. No. 15/154,974.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Kramer, The Combining DAG: A Technique for Parallel Data Flow Analysis, IEEE Transactions on Parallel and Distributed Systems, vol. 5, No. 8, August 1994, pp. 805-813.

(56) References Cited

OTHER PUBLICATIONS

Non-final Office Action dated Apr. 19, 2017, in U.S. Appl. No. 15/154,974.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 5, 2017, in U.S. Appl. No. 15/428,145.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2017, in U.S. Appl. No. 15/154,993.
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Posey, Brien, "How to Combine PowerShell Cmdlets", Jun. 14, 2013 Redmond the Independent Voice of the Microsoft Community (Year: 2013).

* cited by examiner

420 – Example query tasks on table A object t1 = A.Select ("C","D", "M=(C+D)/2")

t2 = A.View ("C","D", "M=(C+D)/2")

t3 = A.Update ("M=(C+D)/2")

t4 = A.UpdateView ("M=(C+D)/2")

430 – Table A update propagation graph query node structure

QUERY TASK PROCESSING BASED ON MEMORY ALLOCATION AND PERFORMANCE CRITERIA

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for providing query operations to users to achieve optimal system performance and usability.

Computers are capable of managing large data sources containing numerous columns and billions of rows. Disk backed storage can provide economical storage of and access to large and growing data sources but the cost is increased input/output transactions across fragmented storage of data. Contiguous storage media more local to the processor, such as RAM, decreases input/output costs and decreases execution time, but necessitates a smaller data set. Often, the input/output and RAM memory allocation versus disk backed storage is a system administrator configuration choice that affects all users. Accordingly, a need exists for a hybrid approach that gives a user clear choices to achieve optimal performance and usability for each individual data retrieval task.

Embodiments were conceived in light of the above mentioned needs, problems and/or limitations, among other things.

Some implementations can include a system for maximizing memory and processing efficiencies in a computer system, the system comprising one or more processors, computer readable storage coupled to the one or more processors, the computer readable storage having stored thereon instructions that, when executed by the one or more processors, cause the one or more processors to perform operations. The operations can include sending a digital request from a client computer to a remote query processor on a query server computer. The operations can also include creating and storing in a computer storage a plurality of data stored in column sources. The operations can further include creating and storing in a computer memory a first table object index mapping data in the plurality of column sources to the first table object, the computer memory having faster access time than the computer storage. The operations can include at the remote query processor, providing memory and processor efficient operations.

The operations can include a select query operation. The operation can include receiving a select query task for assigning to a second table object a subset of rows from one or more column sources from the first table object. The operation can also include creating and storing in the computer memory separate from the computer storage, the second table object comprising a subset of rows. The operation can include creating and storing in the computer memory, a copy of the subset of rows assigned to the second table object. The operation can also include creating and storing in the computer memory separate from the computer storage a second table object index to the copy of the subset of rows assigned to the second table object. The operation can further include storing for formulaic columns in computer storage, a result set from executing a formula in the form of a subset of rows assigned to the second table object, thereby eliminating the use of repeat processing time for re-executing the formula and providing faster access to the subset of rows assigned to the second table object.

The operations can include a view query operation. The operation can include receiving a view query task for assigning to a third table object a subset of rows from one or more column sources from the first table object. The operation can include creating and storing in the computer memory separate from the computer storage, the third table object comprising a subset of rows. The operation can also include accessing in the computer memory the first table object index to the subset of rows assigned to the third table object. The operation can also include storing for formulaic columns in computer storage, a formula for generating a result set for each formulaic column, thereby reducing the use of computer memory.

The operations can include an update query operation. The operation can include receiving an update query task for assigning to a fourth table object a subset of rows from all column sources from the first table object. The operation can also include creating and storing in the computer memory separate from the computer storage, the fourth table object comprising a subset of rows. The operation can further include accessing in the computer memory separate from the computer storage the first table object index to the subset of rows assigned to the fourth table object. The operation can also include storing for formulaic columns in computer storage, a result set from executing a formula in the form of a map, thereby reducing the use of repeat processing time for re-executing the formula.

The operations can include an updateview query operation. The operation can include receiving an updateview query task for assigning to a fifth table object a subset of rows from all the column sources from the first table object. The operation can also include creating and storing in the computer memory separate from the computer storage, the fifth table object comprising a subset of rows. The operation can include accessing in the computer memory separate from the computer storage the first table object index to the subset of rows assigned to the fifth table object. The operation can also include storing for formulaic columns in computer storage, a formula for generating a result set for each formulaic column, thereby reducing the use of computer memory.

The operations can also include wherein the first table object index is arranged according to a strict ordering.

Some implementations can include a system for appending columns in a query, the system comprising one or more processors, computer readable storage coupled to the one or more processors, the computer readable storage having stored thereon instructions that, when executed by the one or more processors, cause the one or more processors to perform operations. The operations can include sending a digital request from a client computer to a remote query processor on a query server computer. The operations can also include creating and storing in a computer storage a plurality of data stored in column sources The operations can further include creating and storing in a computer memory a first table object index mapping data in the plurality of column sources to the first table object, the computer memory having faster access time than the computer storage. The operations can also include at the remote query processor, providing memory and processor efficient operations.

The operations can also include an update query operation. The operation can include receiving an update query task for assigning to a second table object a subset of rows from all column sources from the first table object. The operation can also include creating and storing in the computer memory separate from the computer storage, the second table object comprising a subset of rows. The operation can include accessing in the computer memory separate from the computer storage the first table object index to the subset of rows assigned to the second table object. The operation can also include storing for formulaic columns in computer storage, a result set from executing a formula in the form of a map, thereby reducing the use of repeat processing time for re-executing the formula.

The operations can also include an updateview query operation. The operation can include receiving an updateview query task for assigning to a third table object a subset of rows from all the column sources from the first table object. The operation can also include creating and storing in the computer memory separate from the computer storage, the third table object comprising a subset of rows. The operation can further include accessing in the computer memory separate from the computer storage the first table object index to the subset of rows assigned to the third table object. The operation can also include storing for formulaic columns in computer storage, a formula for generating a result set for each formulaic column, thereby reducing the use of computer memory.

The operations can include wherein the first table object index is arranged according to a strict ordering.

Some implementations can include a system for processing columns in a query, the system comprising one or more processors, computer readable storage coupled to the one or more processors, the computer readable storage having stored thereon instructions that, when executed by the one or more processors, cause the one or more processors to perform operations. The operations can include sending a digital request from a client computer to a remote query processor on a query server computer. The operations can also include creating and storing in a computer storage a plurality of data stored in column sources. The operations can include creating and storing in a computer memory a first table object index mapping data in the plurality of column sources to the first table object, the computer memory having faster access time than the computer storage. The operations can further include at the remote query processor, providing memory and processor efficient operations.

The operations can include a select query operation. The operation can include receiving a select query task for assigning to a second table object a subset of rows from one or more column sources from the first table object. The operation can also include creating and storing in the computer memory separate from the computer storage, the second table object comprising a subset of rows. The operation can include creating and storing in the computer memory, a copy of the subset of rows assigned to the second table object. The operation can also include creating and storing in the computer memory separate from the computer storage a second table object index to the copy of the subset of rows assigned to the second table object. The operation can further include storing for formulaic columns in computer storage, a result set from executing a formula in the form of a subset of rows assigned to the second table object, thereby eliminating the use of repeat processing time for re-executing the formula and providing faster access to the subset of rows assigned to the second table object.

The operations can include a view query operation. The operation can include receiving a view query task for assigning to a third table object a subset of rows from one or more column sources from the first table object. The operation can also include creating and storing in the computer memory separate from the computer storage, the third table object comprising a subset of rows. The operation can further include accessing in the computer memory the first table object index to the subset of rows assigned to the third table object. The operation ca also include storing for formulaic columns in computer storage, a formula for generating a result set for each formulaic column, thereby reducing the use of computer memory.

The operations can include wherein the first table object index is arranged according to a strict ordering.

Some implementations can include a method for maximizing memory and processing efficiencies in a computer system, the method comprising creating and storing in a computer storage a plurality of data stored in column sources. The method can also include creating and storing in a computer memory a first table object index mapping data in the plurality of column sources to the first table object, the computer memory having faster access time than the computer storage. The method can further include providing memory and processor efficient operations.

The operations can include a select query operation. The operation can include receiving a select query task for assigning to a second table object a subset of rows from one or more column sources from the first table object. The operation can include creating and storing in the high-speed computer memory separate from the computer storage, the second table object comprising a subset of rows. The operation can include creating and storing in the computer memory, a copy of the subset of rows assigned to the second table object. The operation can also include creating and storing in the computer memory separate from the computer storage a second table object index to the copy of the subset of rows assigned to the second table object. The operation can include storing for formulaic columns in computer storage, a result set from executing a formula in the form of a subset of rows assigned to the second table object, thereby eliminating the use of repeat processing time for re-executing the formula and providing faster access to the subset of rows assigned to the second table object.

The operations can include a view query operation. The operation can include receiving a view query task for assigning to a third table object a subset of rows from one or more column sources from the first table object. The operation can also include creating and storing in the computer memory separate from the computer storage, the third table object comprising a subset of rows. The operation can include accessing in the high-speed computer memory separate from the computer storage the first table object index to the subset of rows assigned to the third table object. The operation can also include storing for formulaic columns in computer storage, a formula for generating a result set for each formulaic column, thereby reducing the use of computer memory.

The operations can include an update query operation. The operation can include receiving an update query task for assigning to a fourth table object a subset of rows from all column sources from the first table object. The operation can also include creating and storing in the computer memory separate from the computer storage, the fourth table object comprising a subset of rows. The operation can further include accessing in the computer memory separate from the computer storage the first table object index to the subset of rows assigned to the fourth table object. The operation can also include storing for formulaic columns in computer storage, a result set from executing a formula in the form of a map, thereby reducing the use of repeat processing time for re-executing the formula.

The operations can include an updateview query operation. The operation can include receiving an updateview query task for assigning to a fifth table object a subset of rows from all the column sources from the first table object. The operation can also include creating and storing in the computer memory separate from the computer storage, the fifth table object comprising a subset of rows. The operation can further include accessing in the computer memory separate from the computer storage the first table object index to the subset of rows assigned to the fifth table object. The operation can also include storing for formulaic columns in computer storage, a formula for generating a result set for each formulaic column, thereby reducing the use of computer memory.

The method can include wherein the first table object index is arranged according to a strict ordering.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
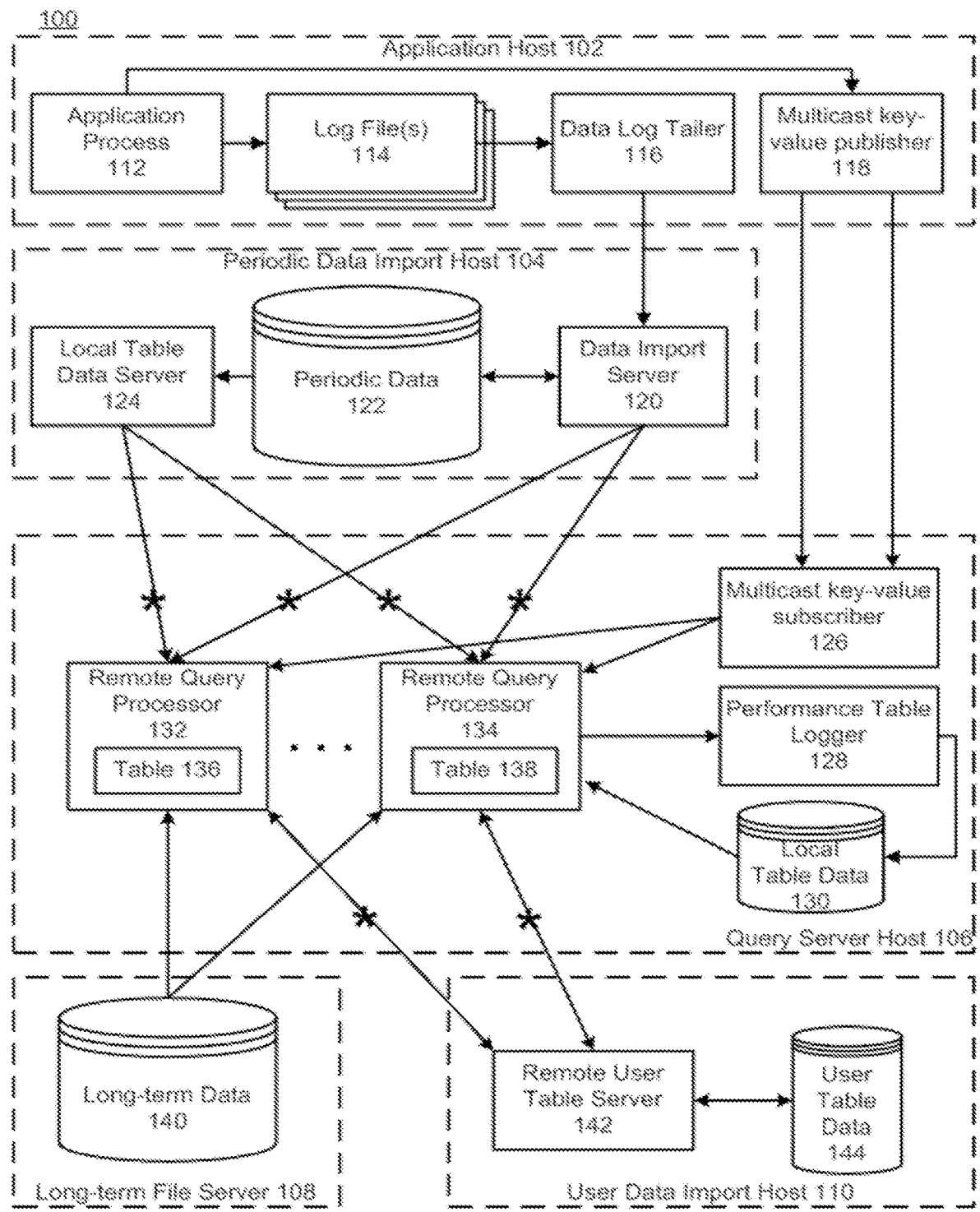
FIG. 1 is a diagram of an example computer data system showing an example data distribution configuration in accordance with some implementations.
Figure 2:
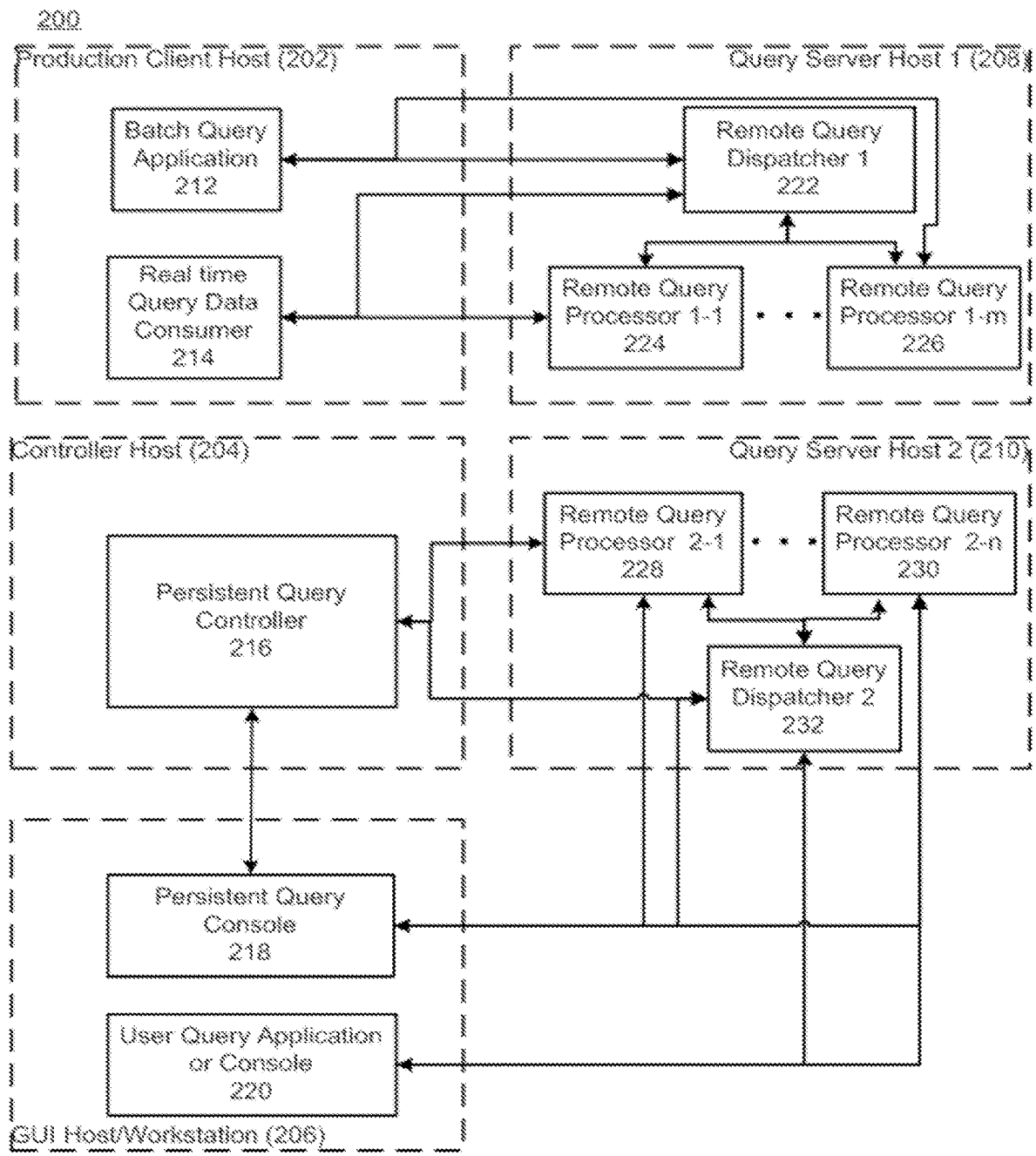
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
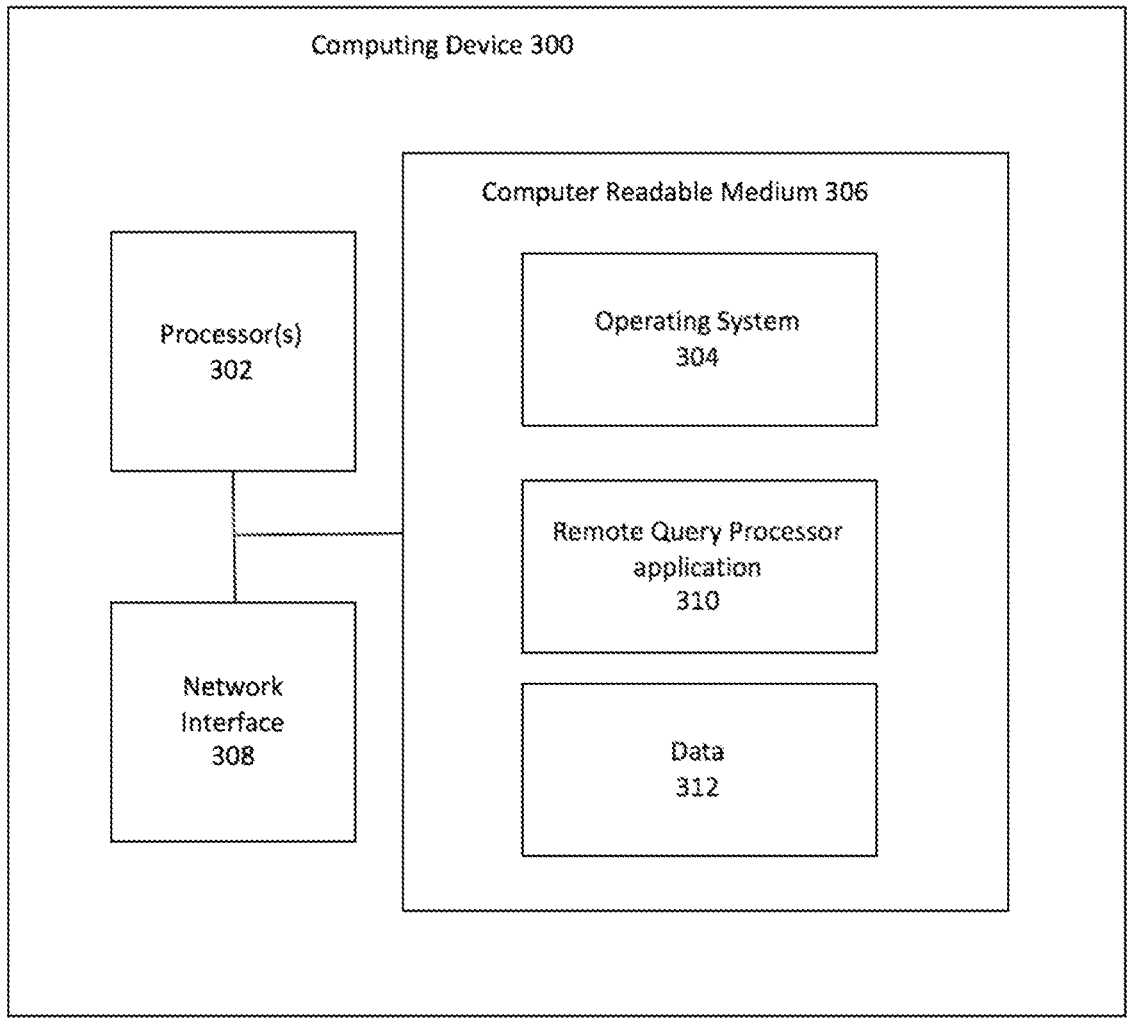
FIG. 3 is a diagram of an example computing device configured for user query task performance consideration in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include remote query processor application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for query task operations based on memory allocation and performance criteria in accordance with the present disclosure.

The application program 310 can operate in conjunction with the data section 312 and the operating system 304.

Large data systems can be dynamic in nature with continuing steams of data being added by the second or even the microsecond. Tables can become quite large and cumbersome to query, putting a burden on system resources, such as memory and processors during query operations. A system's processor and memory usage can benefit from selecting some commands over other commands depending on the memory and processing requirement of each command in relation to the size of the data sets and the type of operation to be performed.

Figure 4:
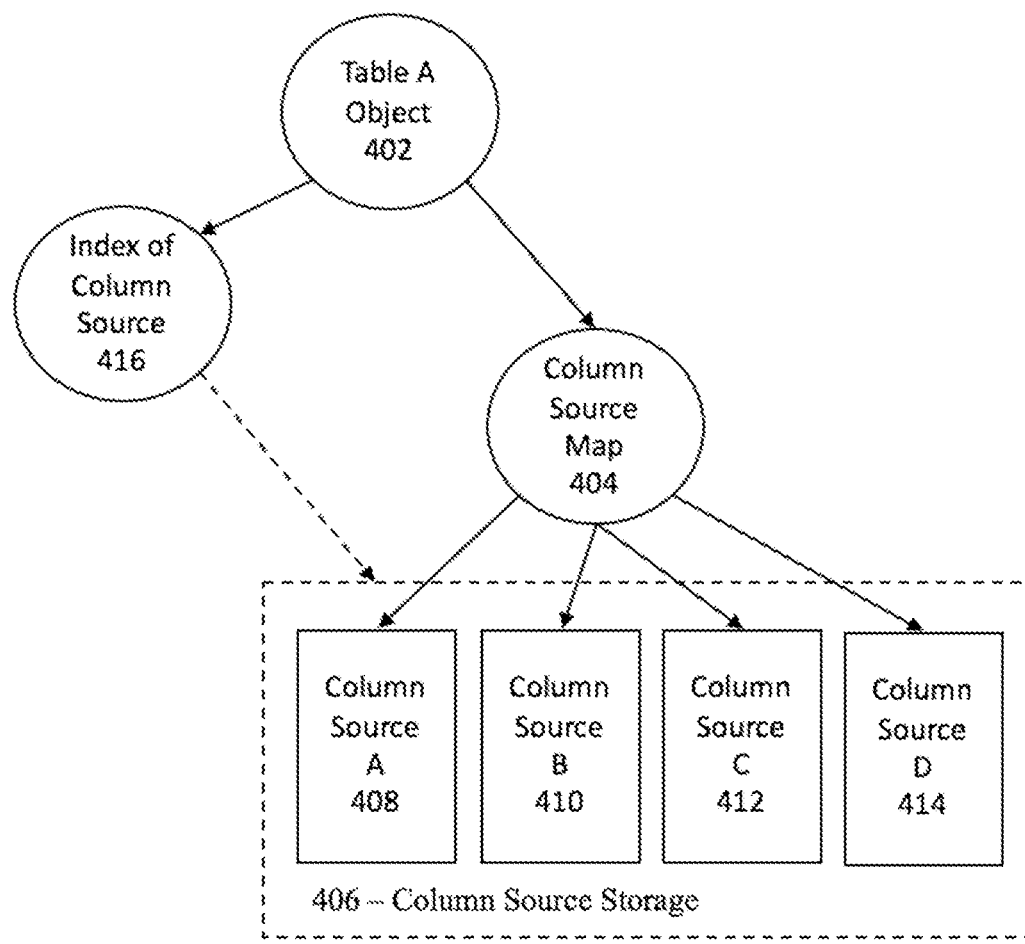
FIG. 4 is a diagram of an example table A structure.

FIG. 4 is a diagram of an example table A. A table A object 402 can be created by designating data columns and a source map 404 to a column source storage 406 column sources (408, 410, 412, 414) for populating the columns. For example, the data columns for the table A object 402 can be created as column A, column B, column C, and column D (not shown). The data sources for columns A-D can be located in a column source storage 406. The column source storage 406 can be any type of storage including disk backed, RAM, virtual (functions), or the like, or a mixture of types. The column data storage 406 can contain an individual column source for table data columns. For example, the column data storage 406 contains 4 column sources, column source A 408, column source B 410, column source C 412, column source D 414.

A column source can be static or dynamic. A static column source can be a column source that contains static data that does not change over time. A dynamic column source can be a column source that can be created with or without an initial set of data and can dynamically change the set of data. For example, a dynamic column source can add one or more rows of data, delete one or more rows of data, modify the content of one or more rows of data, or re-index existing data. For example, column source A 408 can contain stock ticker symbols such as "AAPL" and "SPY" Column source B 410 can contain time stamps for the stock ticker symbols and column source C 412 can contain dates. And column source D 414 can contain quotes associated with the stock ticker symbols at a certain time and date. If data for all four columns is collected every millisecond, a new row of data can be added to each of the four column sources per millisecond.

A column source map 404 can be a map between a column name in a table object and the column source that provides access to data for the column, keyed by values in the table's index. Each table object can have its own column names and multiple column names across many independent table objects can be associated with one column source.

When a table object is created, metadata associated with the table can indicate which column sources to consider in a primary table construction. A user can request a table, and the mapping between column name and source name is already established. For non-primary tables, column sources can be defined based on a parent table and an operation being performed.

It will be appreciated that a query task can be used to create a table by designating the column source for each table object column. For example, the query task for creating a table A object 402, in pseudo code, can be Table A Object 402=column source storage 406 (column A=column source A 408, column B=column source B 410, column C=column source C 412, column D=column source D 414).

An index 416 to the column sources (408, 410, 412, 414) can be created when the table A object 402 is created. The index 416 can reorder the rows of data or point to the rows of data within the column sources (408, 410, 412, 414) in place of creating a copy of the column source data. Data rows in the table A object 402 can be accessed by using the index to retrieve the requested rows from the column sources (408, 410, 412, 414). For example, each row in the column sources (408, 410, 412, 414) can be numbered from 0 to the number of rows minus one. If a table A object 402 is created using the full column sources (408, 410, 412, 414), the table A object 402 index 416 would also contain numbers from 0 to the number of rows minus one. If an index 416 is created from dynamic column sources, the index 416 can change to reflect changes that occur in the column sources. For example, if one or more rows are added to a column source, rows associated to the new rows can be added to the index 416. The index can include an ordering corresponding to an ordering (e.g., a strict ordering) of the data object (e.g., table) and/or one or more of the data sources for the data object. In general, some implementations can include a computer data system that stores and retrieves data (e.g., time series data) according to strict ordering rules. These rules ensure that data is stored in a strict order and that results of a query are evaluated and returned in the same order each time the query is executed. In some implementations, the computer data system may be configured to store and retrieve data according to a total ordering (e.g., an ordering across multiple dimensions). This can provide an advantage of optimizing the query code for query execution speed by permitting a user and query process (e.g., a remote query processor) to rely on an expected ordering and eliminate a need for performing an additional sorting operation on query results to achieve an expected or needed ordering for downstream operations. It also allows data to be ordered according to the source's data publication order without necessarily including data elements to refer to for query evaluation or result ordering purposes.

It will be appreciated that a table object can be created without using the full set of column source data. For example, if a table object is created with a where clause, the index created may only contain the index numbers that match the filtering criteria. For example, if the filtering operation matches only rows from the column sources with row numbers 0, 3, and 16, then the table object index would have the same numbers 0, 3, and 16. The index numbers can also be used to reorder the data.

Figures 4A, 4B:
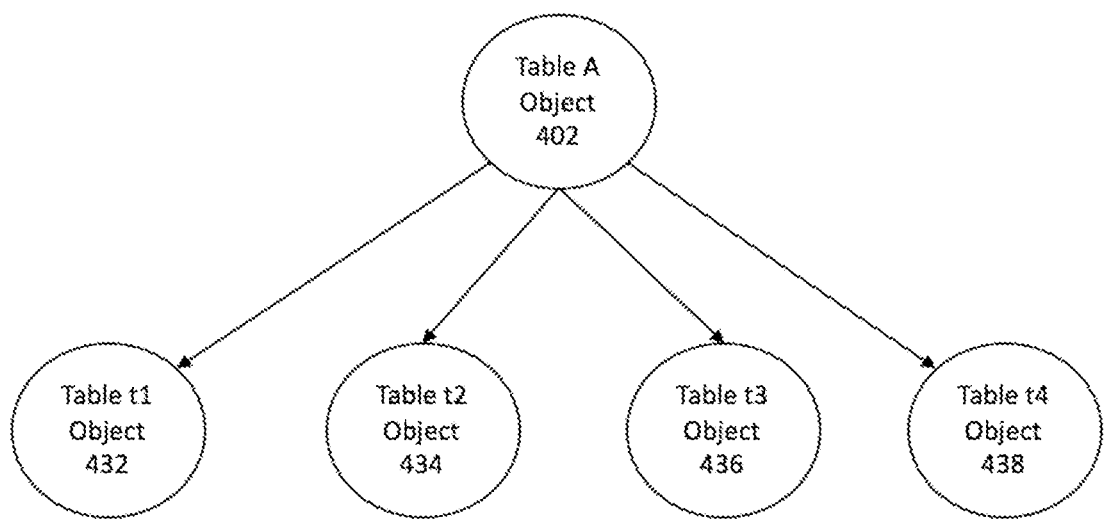
FIG. 4A is a diagram of example operations on a table A object.
FIG. 4B is a diagram of an example table an update propagation graph query node structure.

FIG. 4A is a diagram of a list of example query tasks on a table A object. Each query task can start with a table A object 402. The creation of a table t1 object can be a selection of columns C and D from table A object 402 with the addition of a calculated column M that can be equal to the sum of columns C and D divided by 2. This example is further discussed in FIG. 5. The creation of a table t2 object can be a view of columns C and D from table object 402 with the addition of a calculated column M that can be equal to the sum of columns C and D divided by 2. This example is further discussed in FIG. 6. The creation of a table t3 object can be an update to table A object 402 with the addition of a calculated column M that can be equal to the sum of columns C and D divided by 2. This example is further discussed in FIG. 7. The creation of a table t4 object can be an updateview to table A object 402 with the addition of a calculated column M that can be equal to the sum of columns C and D divided by 2. This example is further discussed in FIG. 8. Each of these query tasks can present somewhat similar data from a table A object 402. But each query task can have different effects on query execution performance and allocation of memory. Examples of these effects and associated advantages or disadvantages are discussed in FIGS. 5-8 below.

FIG. 4B is a diagram of an example table A object update propagation graph query node structure 430. A node can be created for table A object 402 as described above in FIG. 4 and the child nodes can be created for query tasks executed using the table A object 402 as a base table. A table t1 object node 432, a table t2 object node 434, a table t3 object node 436, and a table t4 object node 438 are child nodes to the table A object 402 node that can be created by the respective query tasks as described in FIG. 4A.

Figure 5:
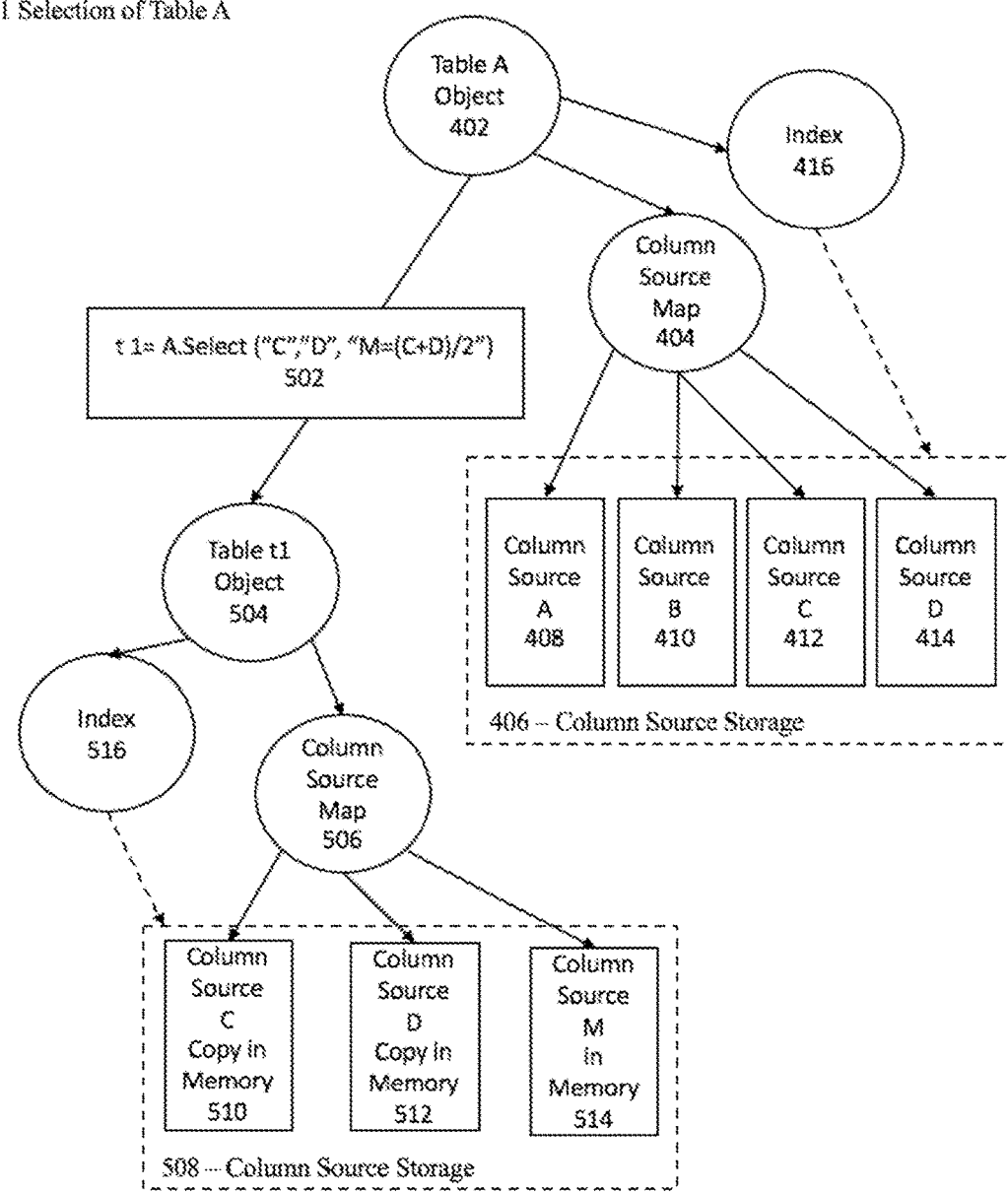
FIG. 5 is a diagram of an example table t1 selection of table A.

FIG. 5 provides further detail to the table t1 selection of the table A object 500. A user can create a query task in the form of t1=A. Select ("C", "D", "M=(C+D)/2") 502 from a remote user query application 220. The query task can be received by a remote query processor 230. The remote query processor 230 can execute the query task to create a table t1 object 504, an index 516, a column source map 506, and a column source storage 508 area which can contain a column source C copy in memory 510, a column source D copy in memory 512, and a column source M in memory 514. Column source M in memory 514 can be a calculated column source from a formula applied to column source C copy in memory 510 and column source D copy in memory 512. In this example, a column source M does not exist in the column source map 404 or the index 416 or in column source storage 406.

As explained in FIG. 4, changes in the column sources (408, 410, 412, 414) can be indexed to a table A object (402). Because a table t1 object 504 retains a connection to the table A object 402, changes to column source C 412 and column D 414 can be propagated respectively to column source C copy in memory 510 and column source D in memory 512, which can cause column source M in memory 514 to be recalculated for the changed rows. If required, the index 516 index is also updated to reflect the changed rows.

It will be appreciated that an informed user can use a "select" query task to create a new table object and move designated column sources, or parts thereof, into memory to achieve increased performance on calculations such as M and for any further query tasks based on the table t2 object 604 because column sources for table t2 object 604 are maintained in memory as opposed to possibly fragmented column source storage 406. It will also be appreciated that a user can limit the use of memory by limiting the number of columns brought into the column source storage 508 by only requesting the preferred columns in the select query task 502. It will be further appreciated that a "select" query task can be useful to force a single evaluation of expensive formula columns.

Figure 6:
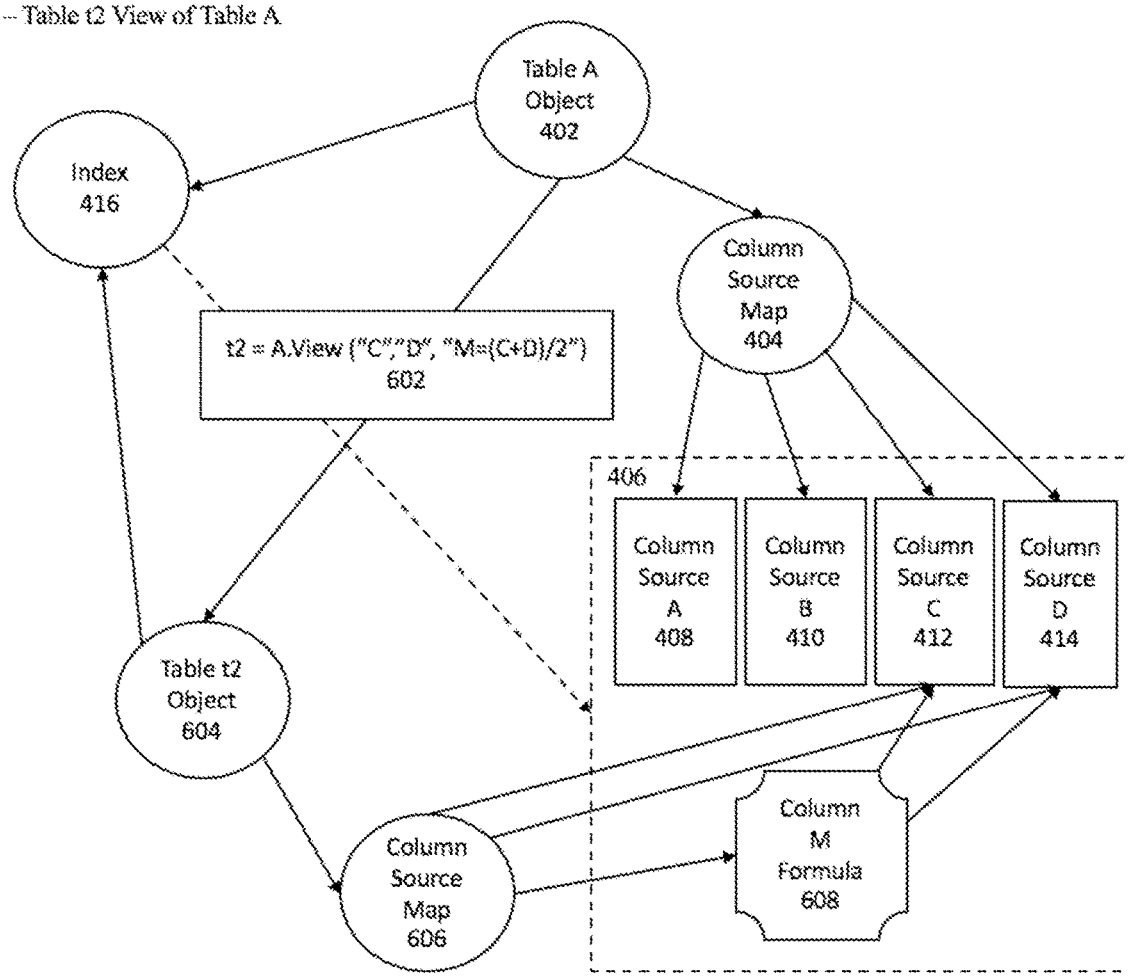
FIG. 6 is a diagram of an example table t2 view of table A.

FIG. 6 is a diagram of an example table t2 view of table A 600. A user can create a query task in the form of t2=A.View ("C", "D", "M=(C+D)/2") 602 from a remote user query application 220. The query task can be received by a remote query processor 230. The remote query processor 230 can execute the query task to create a table t2 object 604, a connection to a table A object index 416, a column source map 606 to column source C 412 and column source D 414. A column M formula 608 can be created in column source storage 406.

In contrast to the table t1 selection of table A 500 example in FIG. 5, the View query task 602 does not make a copy of the chosen columns, column source C 412 and column source D 414 or make a calculation and store column source M in memory 514. In contrast to creating a column source storage 508 in memory, the table t2 view of table A 600 example creates a column source map 606 to map to the existing column source storage 406 column sources 408, 410. Also in contrast in the example, a new index is not created. Instead of creating a new index, the table t2 view of table A reuses index 416 because there are no new column source copies that would require a new index.

It will be appreciated that an informed user can use a "view" query task to create a new table object and use existing column sources to minimize the use of memory for column source storage. There can also be use cases where view is much faster than select. For example, if the column is only accessed for a small fraction of a number of rows, a formula column can be much faster than allocating a giant column and filling in all the values. A view can be used for circumstances where users do not want to allocate or copy data into memory or evaluate all rows of a column source.

It will also be appreciated that a view can be useful if a user is only accessing the column source once. For example, with a where clause, a user can create a view column, then iterate through the view column and then remove the view column. A view/select command combination can require a formula to be evaluated, then the select can additionally require storage of a value and the allocation of memory for the value whereas a view command followed by a where clause would not and thus, can be more efficient.

Figure 7:
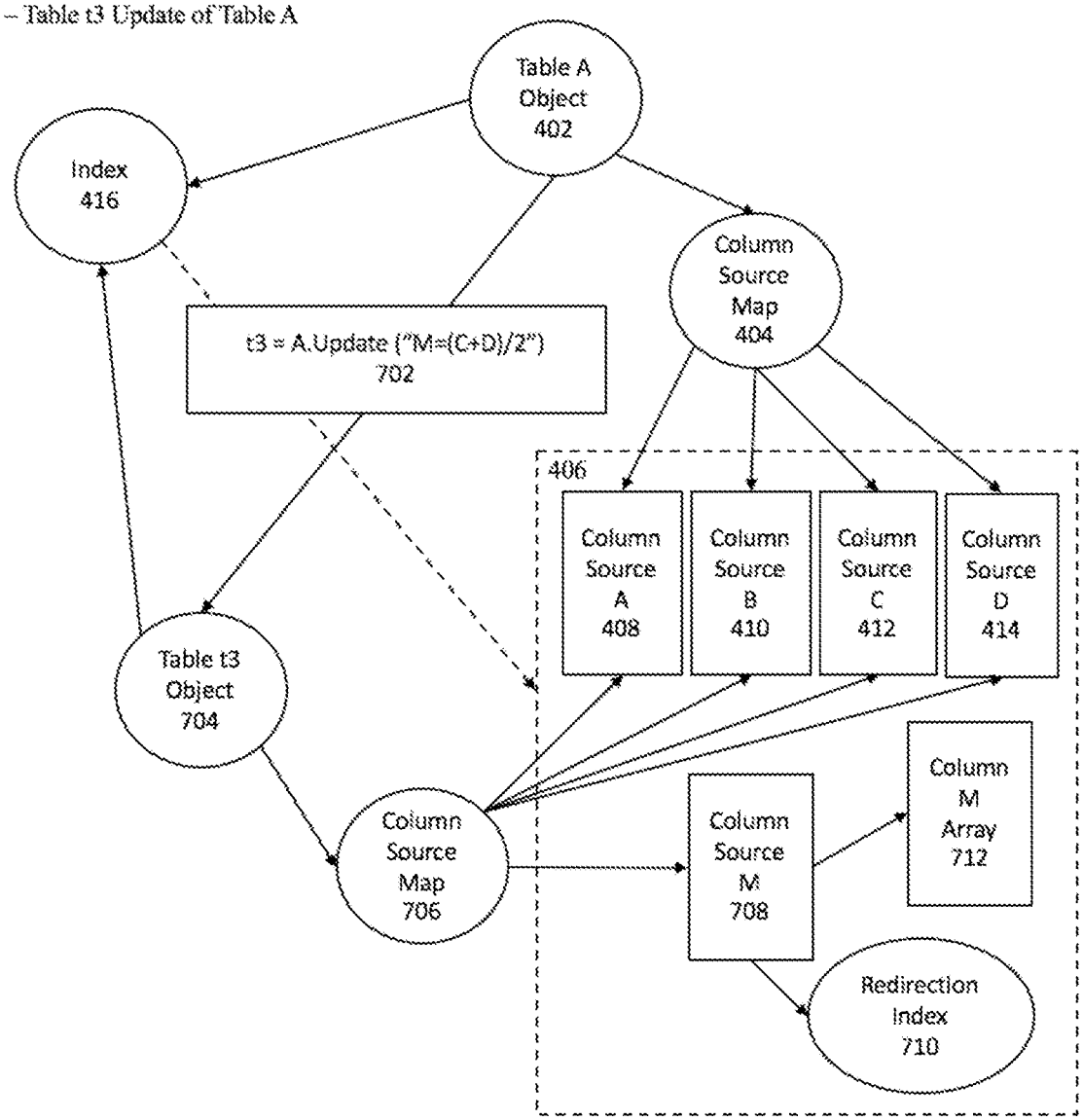
FIG. 7 is a diagram of an example table t3 update of table A.

FIG. 7 is a diagram of an example table t3 update of table A. A user can create a query task in the form of t3=A.Update ("M=(C+D)/2") 702 from a remote user query application 220. The query task can be received by a remote query processor 230. The remote query processor 230 can execute the query task to create a table t3 object 704, a connection to a table A object index 416, a column source map 706 to column source A 408, column source B 410, column source C 412, and column source D 414. A column source M 708, a column M array copy 712, and a redirection index 710 can be created in column source storage 406.

In contrast to the table t1 selection of table A 500 example in FIG. 5 and the table t2 view of table A 600 example in FIG. 6, the Update query task 702 does not provide for a selection of column sources because an update includes all column sources of the table A object 402 and a column can be added and kept in memory with an update, thus not cause a wasteful copying of the original columns because the original columns can be reused with no modifications. In contrast to the table t2 view of table A 600 example, the table t3 update of table A 700 example adds a column source M 708, a column M array copy 712 and a redirection index 710. The column source M 708 can be backed by a array without containing any data itself in contrast to M array copy that can be a copy with data. The redirection index can permit the system to make the table index sparse while having a dense backing array for memory efficiency. The cost for maintaining a redirection index can be recovered by a reduction in memory requirements, and the ability to reuse all of the other column sources.

It will be appreciated that an informed user can use an "update" query task to create a new table object and use existing column sources to minimize the use of memory for storage. The update query task may be used to create a new table that is the same as an existing table with one more new columns added. The columns are constructed by allocating memory and filling in the values. There are some circumstances when this may be the most efficient way to perform a calculation. For example, if the column is very computationally expensive and must be accessed many times, allocating RAM and doing the evaluation once may be advantageous for speed, at the cost of RAM and the initial calculation time.

Figure 8:
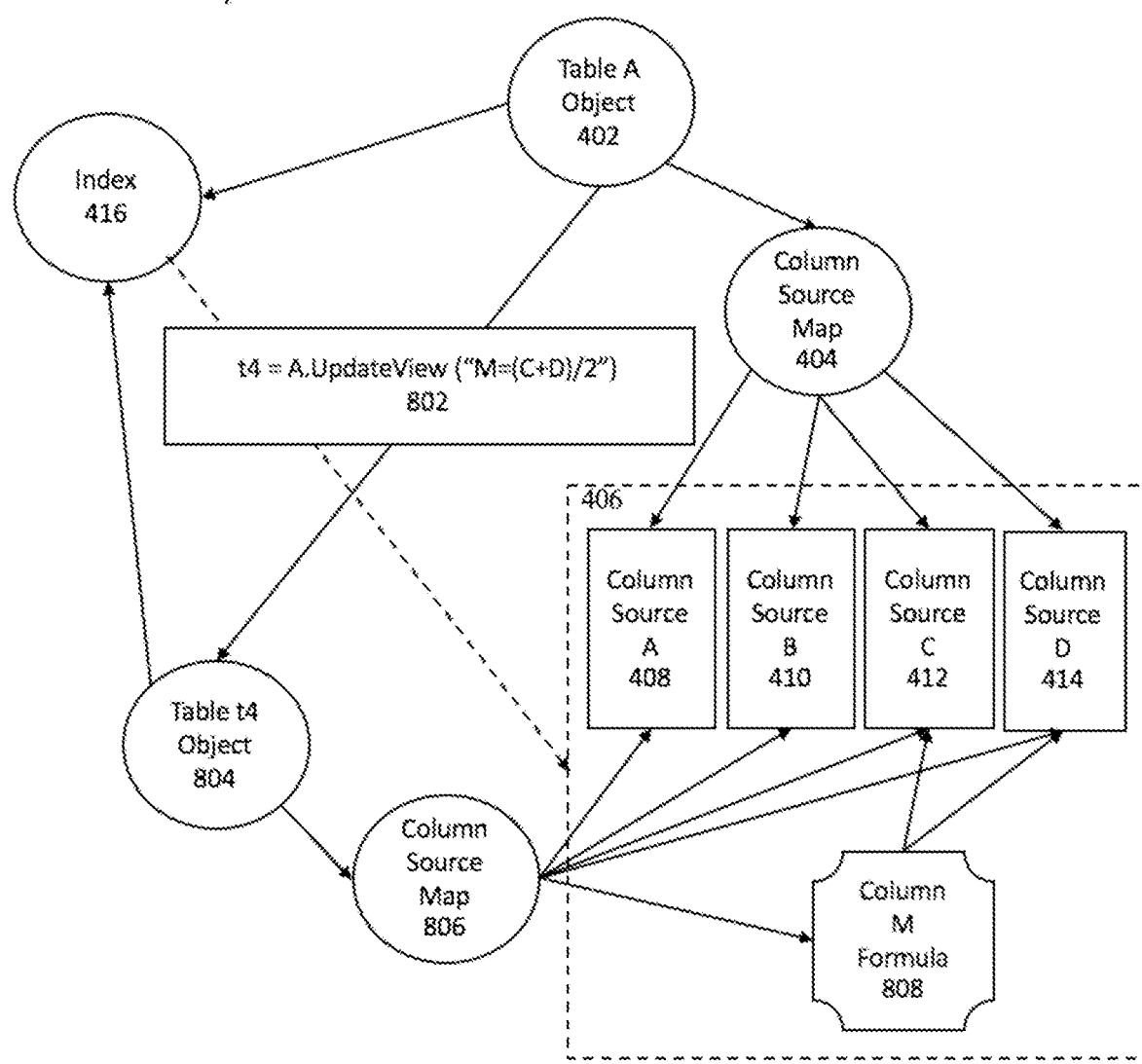
FIG. 8 is a diagram of an example table t4 updateview of table A.

FIG. 8 is a diagram of an example table t4 updateview of table A 800. A user can create a query task in the form of t4=A.UpdateView ("M=(C+D)/2") 802 from a remote user query application 220. The query task can be received by a remote query processor 230. The remote query processor 230 can execute the query task to create a table t4 object 804, a connection to a table A object index 416, a column source map 806 to column source A 408, column source B 410, column source C 412, and column source D 414. A column M formula 708 can be created in column source storage 406.

In contrast to the table t1 selection of table A 500 example in FIG. 5 and the table t2 view of table A 600 example in FIG. 6, the updateview query task 802 does not provide for a selection of column sources because an updateview includes all column sources of the table A object 402. In contrast to the table t3 update of table A 700 example, the table t4 updateview of table A 800 does not add a column source M 708, a column M array 712 and a redirection index 710 but instead adds a column M formula 808 column source storage 406. For every query task that accesses t4, the column M formula 808 can be rerun which can be less efficient than a one-time creation of column source M 808, which would only require a one time calculation when column source M is first created.

It will be appreciated that updateview, like update, can be used to append a column to a table. An updateview can append the column through the use of a formula. An updateview does not allocate RAM or compute values. As a result, updateview can perform well when (1) tables are enormous because updateview does not require the allocation of memory for data copies or (2) only a small fraction of the rows is accessed because running a formula against only a fraction of the rows may not be processor intensive. An updateview may not perform as well when columns are very expensive to compute and are repeatedly accessed. It will be appreciated that an updateView is a form of view provided for convenience, a view operation containing all of the original columns plus the additional columns provides equivalent functionality.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), a graphics processing unit (GPU), or the like. The instructions can be compiled from source code instructions provided in accordance with a programming language such as Java, C, C++, C #.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for query task choices based on system efficiency tradeoffs.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for maximizing memory and processing efficiencies in a computer system, the system comprising:
    one or more processors; and
    computer readable storage coupled to the one or more processors, the computer readable storage having stored thereon instructions that, when executed by the one or more processors, cause the one or more processors to perform operations including:
        receiving, at one of the one or more processors, a digital request from a client computer;
        creating and storing, in a computer storage, data in a plurality of column sources;
        creating and storing, in a computer memory a first table object index mapping data in the plurality of column sources to a first table object, the computer memory having faster access time than the computer storage; and at the one of the one or more processors, providing operations including:
   a select query operation, the select query operation comprising:
      receiving a select query task to assign to a second table object a subset of rows from one or more of the plurality of column sources from the first table object;
      creating and storing, in the computer memory separate from the computer storage, the second table object;
      creating and storing, in the computer memory, a copy of the subset of rows assigned to the second table object;
      creating and storing in the computer memory separate from the computer storage a second table object index mapping the copy of the subset of rows assigned to the second table object to the one or more of the plurality of column sources from the first table object; and
      storing, in a result column in the computer storage, a result set from executing a formula in the form of a subset of rows assigned to the second table object, thereby eliminating repeat processing time for re-executing the formula and providing faster access to the subset of rows assigned to the second table object than access provided via repeat processing for re-executing the formula.

2. The system of claim 1, wherein the first table object index is arranged according to a strict ordering.

3. A system comprising:
one or more processors; and
computer readable storage coupled to the one or more processors, the computer readable storage having stored thereon instructions that, when executed by the one or more processors, cause the one or more processors to perform operations including:
   receiving, at one of the one or more processors, on a query server computer, a digital request from a client computer;
   creating and storing, in a computer storage, data in a plurality of column sources;
   creating and storing in a computer memory a first table object index mapping data in the plurality of column sources to a first table object, the computer memory having faster access time than the computer storage; and
   at the one of the one or more processors, providing operations including:
      an update query operation, the update query operation comprising:
         receiving an update query task to assign to a second table object a subset of rows from all of the plurality of column sources from the first table object;
         creating and storing in the computer memory separate from the computer storage, the second table object;
         accessing in the computer memory separate from the computer storage the first table object index to the subset of rows assigned to the second table object; and
         storing, for a-result column in the computer storage, a result set from executing a formula in the form of a map, thereby reducing repeat processing time for re-executing the formula.

4. The system of claim 3, wherein the first table object index is arranged according to a strict ordering.

5. A system comprising:
one or more processors; and
computer readable storage coupled to the one or more processors, the computer readable storage having stored thereon instructions that, when executed by the one or more processors, cause the one or more processors to perform operations including:
   receiving, at one of the one or more processors, on a query server computer, a digital request from a client computer; creating and storing, in a computer storage, data in a plurality of column sources;
   creating and storing in a computer memory a first table object index mapping data in the plurality of column sources to a first table object, the computer memory having faster access time than the computer storage; and
   at the one of the one or more processors, providing operations including:
      a view query operation, the view query operation comprising:
         receiving a query task to assign to a second table object a subset of rows from one or more of the plurality of column sources from the first table object;
         creating and storing in the computer memory separate from the computer storage, the second table object;
         accessing in the computer memory separate from the computer storage the first table object index to the subset of rows assigned to the second table object; and
         storing, for a-result column in the computer storage, a formula configured to generate a result set, thereby reducing use of computer memory.

6. The system of claim 5, wherein the first table object index is arranged according to a strict ordering.

7. A system comprising:
one or more processors; and
computer readable storage coupled to the one or more processors, the computer readable storage having stored thereon instructions that, when executed by the one or more processors, cause the one or more processors to perform operations including:
   receiving, at one of the one or more processors, on a query server computer, a digital request from a client computer;
   creating and storing, in a computer storage, data in a plurality of column sources;
   creating and storing in a computer memory a first table object index mapping data in the plurality of column sources to a first table object, the computer memory having faster access time than the computer storage; and
   at the one of the one or more processors, providing operations including:
      an update view query operation, the update view query operation comprising:
         receiving a query task to assign to a second table object a subset of rows from all of the plurality of column sources from the first table object;
         creating and storing in the computer memory separate from the computer storage, the second table object;

accessing in the computer memory separate from the computer storage the first table object index to the subset of rows assigned to the second table object; and storing, for a result column in the computer storage, a formula configured to generate a result set, thereby reducing use of computer memory.

8. The system of claim 7, wherein the first table object index is arranged according to a strict ordering.

9. A method comprising:

creating and storing, in a computer storage data, a plurality of column sources;

creating and storing, in a computer memory, a first table object index mapping data in the plurality of column sources to a first table object, the computer memory having faster access time than the computer storage; and providing operations including:

a select query operation, the select query operation comprising:

receiving a select query task to assign to a second table object a subset of rows from one or more of the plurality of column sources from the first table object;

creating and storing, in the computer memory separate from the computer storage, the second table object;

creating and storing, in the computer memory, a copy of the subset of rows assigned to the second table object;

creating and storing in the computer memory separate from the computer storage a second table object index mapping the copy of the subset of rows assigned to the second table object to the one or more of the plurality of column sources from the first table object; and storing, for a result column in the computer storage, a result set from executing a formula in the form of a subset of rows assigned to the second table object, thereby eliminating repeat processing time for re-executing the formula and providing faster access to the subset of rows assigned to the second table object than access provided via repeat processing for re-executing the formula.

10. The method of claim 9, wherein the first table object index is arranged according to a strict ordering.

11. A method comprising:

creating and storing in a computer storage data in a plurality of column sources;

creating and storing in a computer memory a first table object index mapping data in the plurality of column sources to a first table object, the computer memory having faster access time than the computer storage; and providing operations including:

an update query operation, the update query operation comprising:

receiving an update query task to assign to a second table object a subset of rows from all of the plurality of column sources from the first table object;

creating and storing in the computer memory separate from the computer storage, the second table object;

accessing in the computer memory separate from the computer storage the first table object index to the subset of rows assigned to the second table object; and storing, for a-result column in the computer storage, a result set from executing a formula in the form of a map, thereby reducing repeat processing time for re-executing the formula.

12. The method of claim 11, wherein the first table object index is arranged according to a strict ordering.

13. A method comprising:

creating and storing in a computer storage data in a plurality of column sources;

creating and storing in a computer memory a first table object index mapping data in the plurality of column sources to a first table object, the computer memory having faster access time than the computer storage; and providing operations including:

a view query operation, the view query operation comprising:

receiving a query task to assign to a second table object a subset of rows from one or more of the plurality of column sources from the first table object;

creating and storing in the computer memory separate from the computer storage, the second table object;

accessing in the computer memory separate from the computer storage the first table object index to the subset of rows assigned to the second table object; and storing, for a result column in the computer storage, a formula configured to generate a result set, thereby reducing use of computer memory.

14. The method of claim 13, wherein the first table object index is arranged according to a strict ordering.

15. A method comprising:

creating and storing in a computer storage data in a plurality of column sources;

creating and storing in a computer memory a first table object index mapping data in the plurality of column sources to a first table object, the computer memory having faster access time than the computer storage; and providing operations including:

an update view query operation, the update view query operation comprising:

receiving an update view query task to assign to a second table object a subset of rows from all of the plurality of column sources from the first table object;

creating and storing in the computer memory separate from the computer storage, the second table object;

accessing in the computer memory separate from the computer storage the first table object index to the subset of rows assigned to the second table object; and storing, for a-result column in the computer storage, a formula configured to generate a result set, thereby reducing use of computer memory.

16. The method of claim 15, wherein the first table object index is arranged according to a strict ordering.

17. A method comprising:

storing, in a computer memory, a first table object index mapping data in a plurality of column sources to a first table object, the data in the plurality of column sources being stored in a computer storage; and providing operations including:
  a query operation, the query operation comprising:
    receiving a query task to assign to a second table object a subset of rows from one or more of the plurality of column sources from the first table object;
    creating and storing in the computer memory the second table object;
    creating and storing in the computer memory a copy of the subset of rows assigned to the second table object;
    creating and storing in the computer memory a second table object index mapping the copy of the subset of rows assigned to the second table object to the one or more of the plurality of column sources from the first table object; and
    storing, for a result column in the computer storage, a result set from executing a formula of the first table, thereby eliminating repeat processing time for re-executing the formula and providing faster access to the subset of rows assigned to the second table object than access provided via repeat processing for re-executing the formula.

18. The method of claim 17, wherein the first table object index is arranged according to a strict ordering.

19. The method of claim 17, wherein the storing a result set from executing a formula comprises storing the result set in the form of a subset of rows assigned to the second table object.

20. The method of claim 17, wherein the computer storage is a type of memory different than that of the computer memory.

21. A method comprising:
  storing, in a computer memory, a first table object index mapping data in a plurality of column sources to a first table object, the data in the plurality of column sources being stored in a computer storage; and
  providing operations including:
    a query operation, the query operation comprising:
      receiving a query task to assign to a second table object a subset of rows from one or more of the plurality of column sources from the first table object;
      creating and storing in the computer memory the second table object;
      creating and storing in the computer memory a second table object index mapping the subset of rows assigned to the second table object to the one or more of the plurality of column sources from the first table object; and
      storing, for a result column in the computer storage, a result set from executing a formula of the first table, thereby eliminating repeat processing time for re-executing the formula and providing faster access to the subset of rows assigned to the second table object than access provided via repeat processing for re-executing the formula.

22. The method of claim 21, wherein the first table object index is arranged according to a strict ordering.

23. The method of claim 21, wherein the storing a result set from executing a formula comprises storing the result set in the form of a map.

24. The method of claim 21, wherein the receiving comprises receiving the query task to assign to the second table object a subset of rows from all of the plurality of column sources from the first table object.

25. The method of claim 21, wherein the computer storage is a type of memory different than that of the computer memory.

26. A method comprising:
  storing, in a computer memory, a first table object index mapping data in a plurality of column sources to a first table object, the data in the plurality of column sources being stored in a computer storage, wherein the first table object index is arranged according to a strict ordering; and
  providing operations including:
    a query operation, the query operation comprising:
      receiving a query task to assign to a second table object a subset of rows from one or more of the plurality of column sources from the first table object;
      creating and storing in the computer memory the second table object;
      accessing in the computer memory the first table object index to the subset of rows assigned to the second table object; and
      storing, for a result column in the computer storage, a formula configured to generate a result set, thereby reducing use of computer memory.

27. The method of claim 26, wherein the receiving comprises receiving the query task to assign to the second table object a subset of rows from all of the plurality of column sources from the first table object.

28. The method of claim 26, wherein the computer storage is a type of memory different than that of the computer memory.

29. A system comprising:
  one or more processors; and
  computer readable storage coupled to the one or more processors, the computer readable storage having stored thereon instructions that, when executed by the one or more processors, cause the one or more processors to perform operations including:
    storing, in a computer memory, a first table object index mapping data in a plurality of column sources to a first table object, the data in the plurality of column sources being stored in a computer storage; and
    providing operations including:
      a query operation, the query operation comprising:
        receiving a query task to assign to a second table object a subset of rows from one or more of the plurality of column sources from the first table object;
        creating and storing in the computer memory the second table object;
        creating and storing in the computer memory a copy of the subset of rows assigned to the second table object;
        creating and storing in the computer memory a second table object index mapping the copy of the subset of rows assigned to the second table object to the one or more of the plurality of column sources from the first table object; and
        storing a result column including storing a result set from executing a formula of the first table, thereby eliminating repeat processing time for re-executing the formula and providing faster access to the subset of rows assigned to the second table object than access provided via repeat processing for re-executing the formula.

30. The system of claim 29, wherein the first table object index is arranged according to a strict ordering.

31. The system of claim 29, wherein the storing a result set from executing a formula comprises storing the result set in the form of a subset of rows assigned to the second table object.

32. The system of claim 29, wherein the computer storage is a type of memory different than that of the computer memory.

33. A system comprising:
one or more processors; and
computer readable storage coupled to the one or more processors, the computer readable storage having stored thereon instructions that, when executed by the one or more processors, cause the one or more processors to perform operations including:
storing, in a computer memory, a first table object index mapping data in a plurality of column sources to a first table object, the data in the plurality of column sources being stored in a computer storage; and
providing operations including:
a query operation, the query operation comprising:
receiving a query task to assign to a second table object a subset of rows from one or more of the plurality of column sources from the first table object;
creating and storing in the computer memory the second table object;
creating and storing in the computer memory a second table object index mapping the subset of rows assigned to the second table object to the one or more of the plurality of column sources from the first table object; and
storing a result column including storing a result set from executing a formula of the first table, thereby eliminating repeat processing time for re-executing the formula and providing faster access to the subset of rows assigned to the second table object than access provided via repeat processing for re-executing the formula.

34. The system of claim 33, wherein the first table object index is arranged according to a strict ordering.

35. The system of claim 33, wherein the storing a result set from executing a formula comprises storing the result set in the form of a map.

36. The system of claim 33, wherein the receiving comprises receiving the query task to assign to the second table object a subset of rows from all of the plurality of column sources from the first table object.

37. The system of claim 33, wherein the computer storage is a type of memory different than that of the computer memory.

38. A system comprising:
one or more processors; and
computer readable storage coupled to the one or more processors, the computer readable storage having stored thereon instructions that, when executed by the one or more processors, cause the one or more processors to perform operations including:
storing, in a computer memory, a first table object index mapping data in a plurality of column sources to a first table object, the data in the plurality of column sources being stored in a computer storage, wherein the first table object index is arranged according to a strict ordering; and
providing operations including:
a query operation, the query operation comprising:
receiving a query task to assign to a second table object a subset of rows from one or more of the plurality of column sources from the first table object;
creating and storing in the computer memory the second table object;
accessing in the computer memory the first table object index to the subset of rows assigned to the second table object; and
storing a result column including storing a formula configured to generate a result set, thereby reducing use of computer memory.

39. The system of claim 38, wherein the receiving comprises receiving the query task to assign to the second table object a subset of rows from all of the plurality of column sources from the first table object.

40. The system of claim 38, wherein the computer storage is a type of memory different than that of the computer memory.

41. A system comprising:
one or more processors; and
computer readable storage coupled to the one or more processors, the computer readable storage having stored thereon instructions that, when executed by the one or more processors, cause the one or more processors to perform operations including:
storing, in a computer memory, a first table object index mapping data in a plurality of column sources to a first table object, the data in the plurality of column sources being stored in a computer storage; and
providing operations including:
a query operation, the query operation comprising:
receiving a query task to assign to a second table object a subset of rows from all of the plurality of column sources from the first table object;
creating and storing in the computer memory the second table object;
accessing in the computer memory the first table object index to the subset of rows assigned to the second table object; and
storing a result column including storing a formula configured to generate a result set, thereby reducing use of computer memory.

42. A method comprising:
storing, in a computer memory, a first table object index mapping data in a plurality of column sources to a first table object, the data in the plurality of column sources being stored in a computer storage; and
providing operations including:
a query operation, the query operation comprising:
receiving a query task to assign to a second table object a subset of rows from all of the plurality of column sources from the first table object;
creating and storing in the computer memory the second table object;
accessing in the computer memory the first table object index to the subset of rows assigned to the second table object; and
storing, for a result column in the computer storage, a formula configured to generate a result set, thereby reducing use of computer memory.

* * * * *

UNITED STATES PATENT AND TRADEMARK OFFICE
CERTIFICATE OF CORRECTION

PATENT NO. : 10,552,412 B2
APPLICATION NO. : 15/448930
DATED : February 4, 2020
INVENTOR(S) : Charles Wright et al.

Page 1 of 1

It is certified that error appears in the above-identified patent and that said Letters Patent is hereby corrected as shown below:

In the Claims

In Column 17, Line 66, in Claim 3, delete "a-result" and insert --a result--

In Column 18, Line 36, in Claim 5, delete "a-result" and insert --a result--

In Column 20, Line 5, in Claim 11, delete "a-result" and insert --a result--

In Column 20, Line 60, in Claim 15, delete "a-result" and insert --a result--

Signed and Sealed this
Second Day of June, 2020

Andrei Iancu
*Director of the United States Patent and Trademark Office*